(12) United States Patent
Gaj et al.

(10) Patent No.: US 12,304,851 B2
(45) Date of Patent: May 20, 2025

(54) ENERGY DELIVERY OPTIMIZATION FOR LASER THICKNESS CONTROL OF FUSION GLASS SYSTEM AND METHODS

(71) Applicant: CORNING INCORPORATED, Corning, NY (US)

(72) Inventors: Michael Peter Gaj, Horseheads, NY (US); Matthew Miacomet Winter Johnston, Lindley, NY (US); Philip Robert LeBlanc, Corning, NY (US); Robert Arthur McIntosh, Painted Post, NY (US); Remy Tumbar, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 83 days.

(21) Appl. No.: 17/766,328

(22) PCT Filed: Oct. 6, 2020

(86) PCT No.: PCT/US2020/054341
§ 371 (c)(1),
(2) Date: Apr. 4, 2022

(87) PCT Pub. No.: WO2021/080766
PCT Pub. Date: Apr. 29, 2021

(65) Prior Publication Data
US 2024/0051862 A1 Feb. 15, 2024

Related U.S. Application Data

(60) Provisional application No. 62/924,312, filed on Oct. 22, 2019.

(51) Int. Cl.
*C03B 17/06* (2006.01)
*B23K 26/062* (2014.01)
*B23K 26/354* (2014.01)

(52) U.S. Cl.
CPC .......... *C03B 17/067* (2013.01); *B23K 26/062* (2015.10); *B23K 26/354* (2015.10)

(58) Field of Classification Search
CPC ........................... C03B 17/064; C03B 17/067
See application file for complete search history.

(56) References Cited

U.S. PATENT DOCUMENTS 8,904,822 B2   12/2014 Leblanc et al.
9,758,418 B1 *  9/2017 El-Kahlout ........... C03B 17/064
                      (Continued)

FOREIGN PATENT DOCUMENTS

CN    104768883 A    7/2015
CN    108838548 A   11/2018
                   (Continued)

OTHER PUBLICATIONS

JP-2001281582-A EPO Machine Translation Retreived Oct. 9, 2024. (Year: 2024).*

(Continued)

*Primary Examiner* — Lisa L Herring
(74) *Attorney, Agent, or Firm* — Ryan T. Hardee; Grant A. Gildehaus

(57) ABSTRACT

Apparatuses and methods are described for controlling the thickness of glass during glass sheet production. The apparatuses and methods employ a laser beam to heat a particular portion of the molten glass. In some examples, a laser beam control system controls the laser beam to generate a more consistent glass thickness across the glass sheet. In some examples, the laser beam control system multiplexes the laser beam to heat various portions of the glass, for example, simultaneously.

20 Claims, 10 Drawing Sheets

(56) References Cited

U.S. PATENT DOCUMENTS

| | | | | |
|---|---|---|---|---|
| 2005/0049129 A1* | 3/2005 | Belcastro | ............ | B23K 26/0846 |
| | | | | 493/63 |
| 2014/0123703 A1 | 5/2014 | Leblanc et al. | | |
| 2018/0334405 A1* | 11/2018 | Buellesfeld | ............ | C03B 17/064 |
| 2019/0039170 A1* | 2/2019 | Ahner | .................. | B23K 26/067 |
| 2019/0039173 A1 | 2/2019 | Tung et al. | | |
| 2021/0387261 A1* | 12/2021 | Takeshita | ................ | B33Y 50/02 |
| 2022/0326492 A1* | 10/2022 | Chase | .................. | B23K 26/083 |

FOREIGN PATENT DOCUMENTS

| | | | | | |
|---|---|---|---|---|---|
| JP | 2001281582 A | * | 10/2001 | ............. | B23K 26/06 |
| KR | 10-2019-0099098 A | | 8/2019 | | |
| WO | WO-2015179989 A1 | * | 12/2015 | ......... | B23K 26/0075 |
| WO | 2016/077171 A2 | | 5/2016 | | |
| WO | WO-2019040858 A1 | * | 2/2019 | ........... | C03B 17/067 |
| WO | 2019/173358 A1 | | 9/2019 | | |
| WO | 2020/055635 A1 | | 3/2020 | | |

OTHER PUBLICATIONS

International Search Report and Written Opinion of the International Searching Authority; PCT/US2020/054341; mailed on Jan. 19, 2021, 12 pages; European Patent Office.

Korean Patent Application No. 10-2022-7017165 , Notice of Allowance dated Mar. 11, 2025, 3 pages (English Translation only), Korean Patent Office.

* cited by examiner

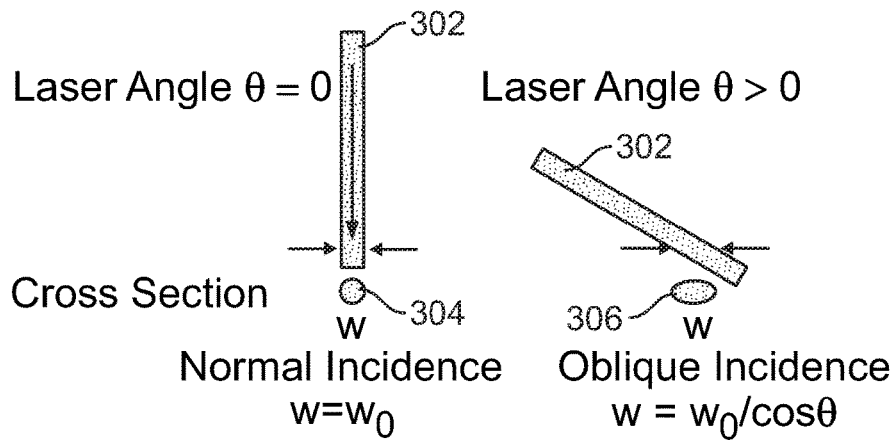
FIG. 3A
FIG. 3B
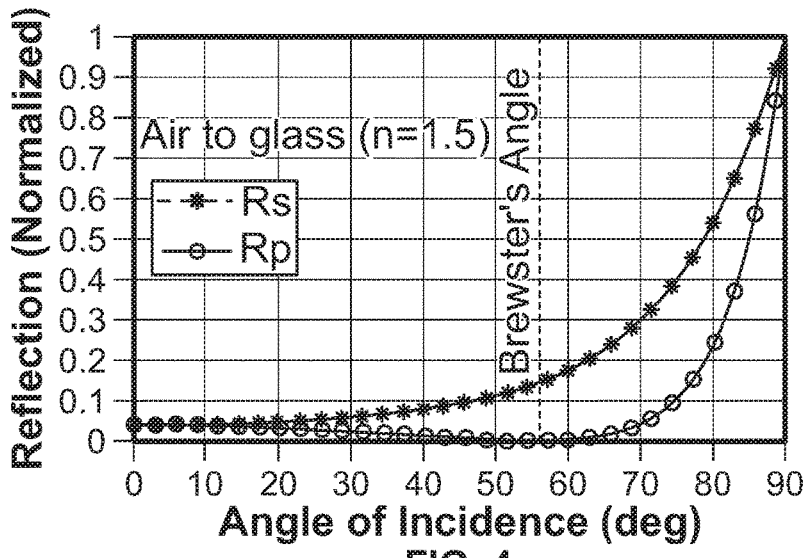
FIG. 4
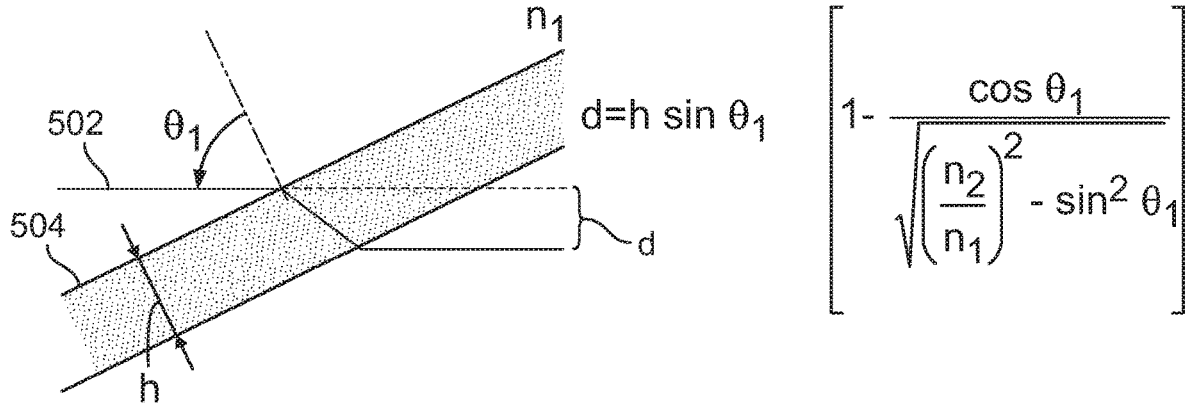
FIG. 5

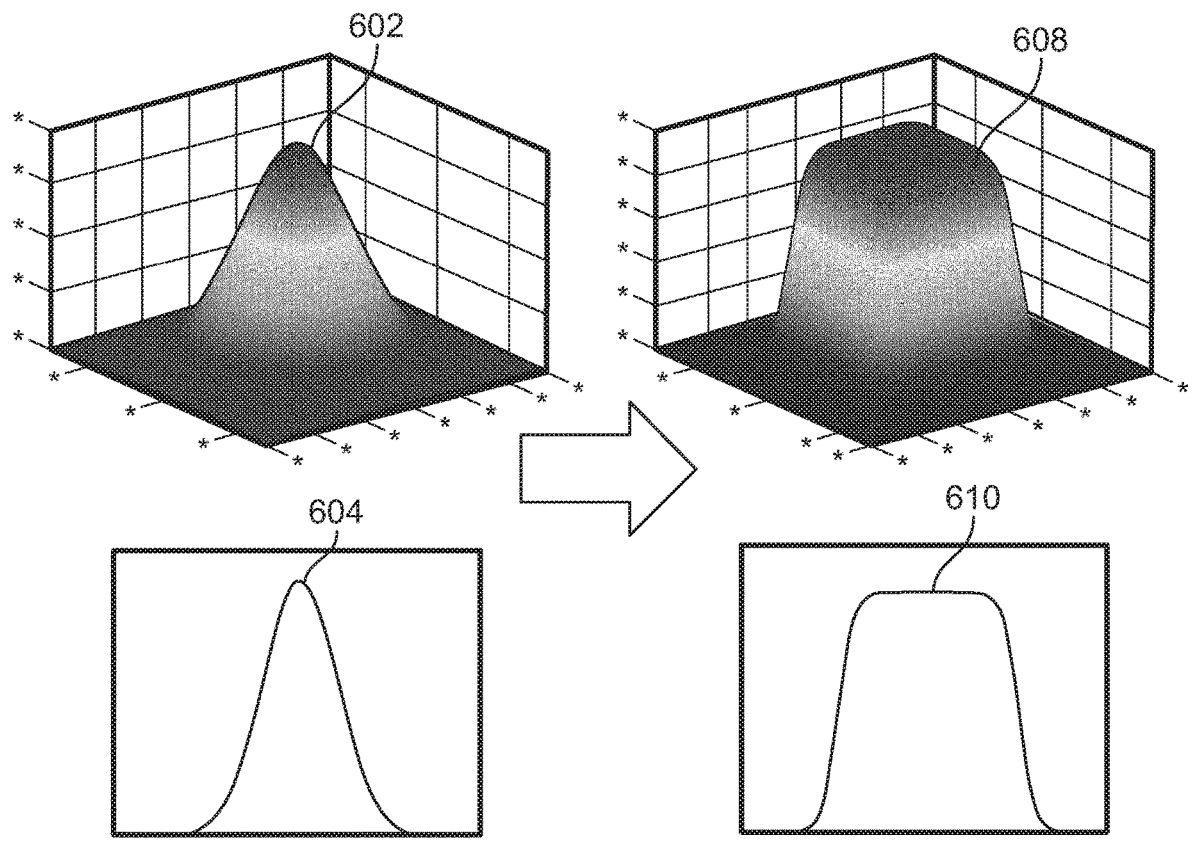
FIG. 6A
FIG. 6B
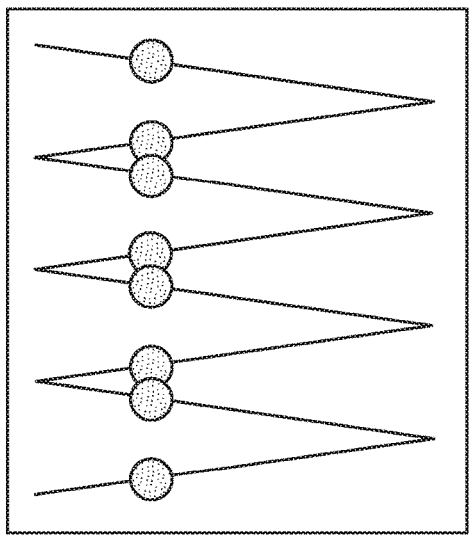
Nominal Beam Shape ○
→ Scan-to-scan Gaps
FIG. 7A
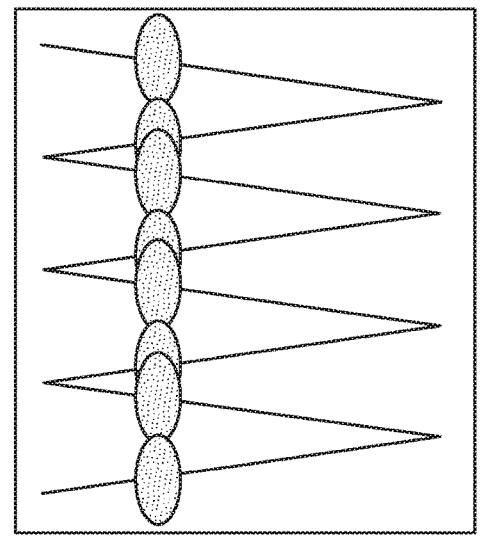
Nominal Beam Shape ⬭
→ no Gaps
FIG. 7B

ENERGY DELIVERY OPTIMIZATION FOR LASER THICKNESS CONTROL OF FUSION GLASS SYSTEM AND METHODS

CROSS-REFERENCE TO RELATED APPLICATIONS

This application is a national stage entry of International Patent Application Serial No. PCT/US2020/054341 filed on Oct. 6, 2020, which in turn, claims the benefit of priority under 35 U.S.C. § 119 of U.S. Provisional Application Ser. No. 62/924,312 filed on Oct. 22, 2019, the contents of each of which are relied upon and incorporated herein by reference in their entireties.

FIELD OF THE DISCLOSURE

The present disclosure relates to the production of glass sheets and, more particularly, to apparatus and methods for controlling the thickness of glass during glass sheet production.

BACKGROUND

Glass sheets are used in a variety of applications. For example, they may be used in glass display panels such as in mobile devices, laptops, tablets, computer monitors, and television displays. Glass sheets may be manufactured by a fusion drawdown process whereby molten glass is drawn over a glass forming apparatus. For a variety of applications, the close control of the thickness of manufactured glass can be important. Thermo-mechanical and glass flow conditions can be uneven across the entirety or portions of a width of a glass ribbon as it is being formed in the fusion drawdown process. For example, surface tension at the glass ribbon as it is being formed may be inadequate to entirely obviate variations that can occur in the thickness of the glass ribbon. Even though, in some examples, glass thickness variations may be a few microns in size, the variations are undesirable as the consequences can be significant. As such, there are opportunities to improve the production of glass sheets.

SUMMARY

Features disclosed herein allow for control of glass (e.g., ribbon) thickness using energy delivered by a laser in a glass forming apparatus. For example, the features disclosed herein may improve the uniformity, precision, speed, and control of laser energy being delivered by the laser to produce relatively more uniform glass. Among various advantages, the embodiments may allow for the delivery of consistent laser energy along a sheet of molten glass. The embodiments may also allow for the automatic compensation of beam position deviation and power loss as a laser is scanned across a window. In some examples, the embodiments may allow for mitigation of down-the-draw variations by, for example, providing for the modification of laser beam shape. Some embodiments may also employ multiple laser beams to heat the molten glass, which may allow for more quickly scanning the molten glass. These embodiments may also allow for a larger area of the molten glass to be scanned with a single scanning system. Those of ordinary skill in the art having the benefit of these disclosures may recognize other benefits as well.

In some examples, a laser control system can preselect a portion of molten glass of a glass forming apparatus. The laser control system can configure a reflecting apparatus to reflect a laser beam from a laser generator to the preselected portion of the molten glass. The laser control system can determine a power density for the laser beam based on an angle of incidence of the laser beam relative to the preselected portion of the molten glass. The laser control system can also activate the laser generator to generate the laser beam at the determined power density to heat the preselected portion of the molten glass.

In some examples, the laser control system can determine the angle of incidence of the laser beam relative to the preselected portion of the molten glass based on a position of the reflecting apparatus.

In some examples, the laser control system can determine an amount of laser energy of the laser beam to be reflected from the preselected portion of the molten glass based on the angle of incidence. The laser control system can then determine the power density for the laser beam based on the amount of laser energy of the laser beam to be reflected from the preselected portion of the molten glass.

In some examples, the laser control system can determine a lateral shift the laser beam will experience when proceeding through at least one window. The laser control system can then configure the reflecting apparatus to reflect the laser beam from the laser generator to the preselected portion of the molten glass based on the determined lateral shift.

In some examples, the laser control system can determine a length the laser beam will travel from the reflecting apparatus to the preselected portion of the molten glass. The laser control system can then configure the laser generator to generate the laser beam with a waist that is positioned at the preselected portion of the molten glass. In some examples, the laser control system can deactivate the laser generator to disable the laser beam. The laser beam control system can then configure the reflecting apparatus to reflect the laser beam from the laser generator to another preselected portion of the molten glass. The laser control system can also determine a change in the length that the laser beam will travel from the reflecting apparatus to the other preselected portion of the molten glass, and can configure the laser generator to generate the laser beam with a waist that will be positioned at the other preselected portion of the molten glass. The laser control system can then reactivate the laser generator to enable the laser beam. In some examples, the laser control system keeps the laser generator enabled as the laser control system configures the reflecting apparatus to reflect the laser beam to various portions of the molten glass. For example, the laser control system modulates the laser power and can turn it to a very low setting (e.g., essentially zero power) when no heat energy needs to be provided to the glass (e.g., sections already thin enough). The laser control system then increases the laser beam power when covering glass sections where thinning is desired.

In some examples, a beam shaping element, such as diffractive optical element (DOE) or spatial light modulator (SLM), can be employed by the laser control system. The beam shaping element modifies (e.g., shapes) an incident laser beam such that a projected laser beam pattern on the molten glass has a predetermined energy distribution. The laser control system may tailor the spatial distribution of the energy provided by the laser to meet application needs (e.g., a uniform energy across the molten glass to account for contours, etc.).

In some examples, an apparatus comprises a laser generator operable to generate a laser beam. The apparatus can also comprise a reflecting apparatus configured to reflect the laser beam from the laser generator to molten glass of a glass forming apparatus. The apparatus can also comprise a controller communicatively coupled to the laser generator and the reflecting apparatus. The controller can be configured to preselect a portion of the molten glass of the glass forming apparatus. The controller can also be configured to configure the reflecting apparatus to reflect the laser beam from the laser generator to the preselected portion of the molten glass. The controller can be configured to determine a power density for the laser beam based on an angle of incidence of the laser beam relative to the preselected portion of the molten glass. The controller can also be configured to activate the laser generator to generate the laser beam at the determined power density to heat the preselected portion of the molten glass.

The disclosure describes, in an embodiment, an apparatus comprising a memory device storing instructions; and a controller comprising at least one processor and configured to execute the instructions. When executed, the instructions cause the controller to: preselect a portion of molten glass of a glass forming apparatus; configure a reflecting apparatus to reflect a laser beam from a laser generator to the preselected portion of the molten glass; determine a power density for the laser beam based on an angle of incidence of the laser beam relative to the preselected portion of the molten glass; and activate the laser generator to generate the laser beam at the determined power density to heat the preselected portion of the molten glass.

The disclosure describes, in another embodiment, an apparatus comprising a laser generator operable to generate a laser beam; a reflecting apparatus configured to reflect the laser beam from the laser generator to a glass forming apparatus; and a controller communicatively coupled to the laser generator and the reflecting apparatus. The controller may be configured to: preselect a portion of molten glass of the glass forming apparatus; configure the reflecting apparatus to reflect a laser beam from the laser generator to the preselected portion of the molten glass; determine a power density for the laser beam based on an angle of incidence of the laser beam relative to the preselected portion of the molten glass; and activate the laser generator to generate the laser beam at the determined power density to heat the preselected portion of the molten glass.

The disclosure describes, in yet another embodiment, a method for heating molten glass of a glass forming apparatus, comprising the steps of: preselecting a portion of molten glass of a glass forming apparatus; configuring a reflecting apparatus to reflect a laser beam from a laser generator to the preselected portion of the molten glass; determining a power density for the laser beam based on an angle of incidence of the laser beam relative to the preselected portion of the molten glass; and activating the laser generator to generate the laser beam at the determined power density to heat the preselected portion of the molten glass.

The disclosure describes, in a further embodiment, a method for heating molten glass of a glass forming apparatus, comprising the steps of: preselecting a portion of molten glass of a glass forming apparatus; configuring a reflecting apparatus to reflect a laser beam from a laser generator to the preselected portion of the molten glass; determining a length the laser beam will travel from the reflecting apparatus to the preselected portion of the molten glass; and configuring the laser generator to generate the laser beam with a waist that is positioned at the preselected portion of the molten glass.

The disclosure describes, in yet a further embodiment, a method for heating molten glass of a glass forming apparatus, comprising the steps of: preselecting a portion of molten glass of a glass forming apparatus; configuring a reflecting apparatus to reflect a laser beam from a laser generator to the preselected portion of the molten glass; determining a length the laser beam will travel from the reflecting apparatus to the preselected portion of the molten glass; configuring the laser generator to generate the laser beam with a waist that is positioned at the preselected portion of the molten glass; and activating the laser generator to generate the laser beam.

The disclosure describes, in a further embodiment, a method for heating molten glass of a glass forming apparatus, comprising the steps of: determining a position of a reflecting apparatus relative to molten glass to be heated by a laser beam; determining an expected angle of incidence of the laser beam reflecting off the reflecting apparatus onto the molten glass; computing a power density for the laser beam based on the computed angle of incidence; and configuring a laser generator to generate the laser beam with the computed power density.

In some examples, a multiplexing laser control system comprises a laser generator to generate a laser beam, a dynamic focus device, a multiplexer, and a plurality of beam scanning devices. The laser generator is configured to generate a laser beam and provide the laser beam through the dynamic focus device. The dynamic focus device applies at least one dynamic focusing operation to the laser beam, and directs the focused laser beam to the multiplexer. The multiplexer provides the laser beam, either on a sequential (e.g., temporal) basis or simultaneously, to the plurality of beam scanning devices. Each of the beam scanning devices may provide the laser beam to a portion of molten glass of a glass forming apparatus.

The disclosure describes, in another embodiment, a method for heating molten glass of a glass forming apparatus, comprising the steps of configuring a multiplexer to provide a laser beam to a plurality of beam scanning devices; synchronizing a dynamic focus device to the plurality of beam scanning devices; configuring a laser beam generator to generate the laser beam, where the laser beam proceeds from the laser generator to a multiplexer, and from the multiplexer to a plurality of beam scanning devices; and heating a portion of the molten glass with the laser beam from the at least one of the plurality of beam scanning devices.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, Figures may omit views of certain features.

FIGS. 3A and 3B illustrates a laser beam, generated by the glass forming apparatus of FIG. 1, incident on a portion of glass in accordance with some examples.

FIG. 4 illustrates an intensity of reflected laser light from a laser beam generated by the glass forming apparatus of FIG. 1 at various angles of incidence in accordance with some examples.

FIG. 5 illustrates a lateral shift experienced by a laser beam proceeding through a window in accordance with some examples.

FIGS. 6A and 6B illustrate the shaping of a laser beam by the laser beam control system of FIG. 2 in accordance with some examples.

FIGS. 7A and 7B illustrate the elongating of a laser beam by the laser beam control system of FIG. 2 in accordance with some examples.

DETAILED DESCRIPTION

Figure 1:
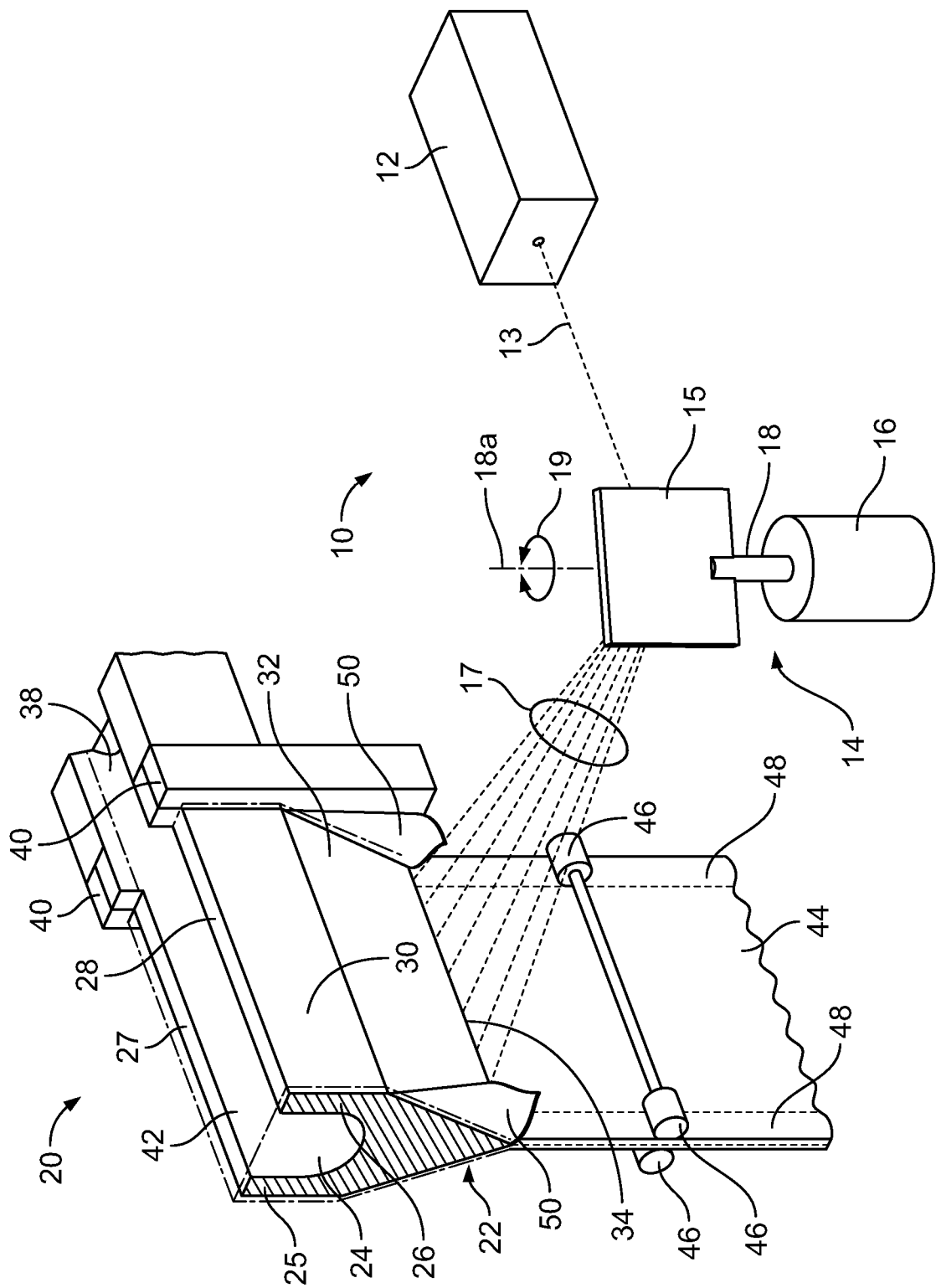
FIG. 1 schematically illustrates an exemplary glass forming apparatus with a laser beam control system in accordance with some examples.

The present application discloses illustrative (i.e., example) embodiments. The disclosure is not limited to the illustrative embodiments. Therefore, many implementations of the claims will be different than the illustrative embodiments. Various modifications can be made to the claims without departing from the spirit and scope of the disclosure. The claims are intended to cover implementations with such modifications.

At times, the present application uses directional terms (e.g., front, back, top, bottom, left, right, etc.) to give the reader context when viewing the Figures. The claims, however, are not limited to the orientations shown in the Figures. Any absolute term (e.g., high, low, etc.) can be understood as disclosing a corresponding relative term (e.g., higher, lower, etc.).

The present disclosure presents apparatus and methods to control ribbon thickness using energy delivered by a laser during a glass forming process. In some examples, the uniformity, precision, speed, and/or control of laser energy provided by the laser to a glass ribbon is improved.

Among various advantages, the embodiments may allow for the delivery of consistent laser energy along a sheet of molten glass. The embodiments may also allow for the automatic compensation of beam position deviation and power loss as a laser is scanned across a window. In some examples, the embodiments may allow for mitigation of down-the-draw variations by, for example, providing for the modification of laser beam shape. Some embodiments may also employ multiple laser beams to heat the molten glass, which may allow for more quickly scanning the molten glass. These embodiments may also allow for a larger area of the molten glass to be scanned with a single scanning system. Those of ordinary skill in the art having the benefit of these disclosures may recognize other benefits as well.

In some examples, a laser beam is directed to a molten glass ribbon, such as above the root level, by a laser beam control system. The laser beam system causes a decrease in viscosity that, if allowed, creates a new surface tension equilibrium in the molten glass ribbon, and which would be set into the cooled glass as, for example, a decrease in glass thickness.

The laser beam control system may, in some examples, compensate for glass thickness changes caused by a decrease in viscosity. If allowed, the decrease in viscosity creates a new surface tension equilibrium in the molten glass ribbon, which would be set into the cooled glass as, for example, a decrease in glass thickness.

In some examples, the laser beam control system compensates for errors (e.g., loss of laser beam energy) caused by laser beam incident angles and laser beam reflections (e.g., Fresnel reflections). In some examples, the laser beam compensates for laser beam transmission losses through portions of a glass forming system, such as windows (e.g., glass or plastic windows). The laser beam control system may allow for a consistent energy profile to be applied across a molten glass ribbon (e.g., glass sheet).

In some examples, the laser beam control system improves glass thickness consistency by modifying a beam shape of a laser beam directed to molten glass during the glass forming process. In some examples, the laser beam control system improves glass thickness consistency by adjusting the placement of the laser beam's waist based on a laser beam angle to the glass and length from the laser beam source to a target area of the molten glass ribbon.

In some examples, the laser beam control system employs multiple laser beams to scan across a ribbon of molten glass to: scan more quickly across the glass; cover a larger area of the glass with a single scanning system (say, for scalability); and/or more easily create a fixed (or time-varying) laser beam pattern on the glass. In some examples, the laser beam control system employs one or more of a diffractive optical element, an acousto-optic modulator, or other optical and electronic means to divide a laser beam into multiple laser beams simultaneously or sequentially directed to the ribbon of molten glass.

Referring to FIG. 1, glass forming apparatus 20 includes a forming wedge 22 with an open channel 24 that is bounded on its longitudinal sides by walls 25 and 26. The walls 25 and 26 terminate at their upper extent in opposed longitudinally extending overflow weirs 27 and 28, respectively. The overflow weirs 27 and 28 are integral with a pair of opposed and substantially vertical forming surfaces 30 that, in turn, are integral with a pair of opposed downwardly inclined converging forming surfaces 32. The pair of downwardly inclined converging surfaces 32 terminate at a substantially horizontal lower apex that comprises a root 34 of the forming wedge 22. Each of the downwardly inclined converging surfaces 32 may include, in some examples, a pair of edge directors 50. One downwardly inclined converging surface 32 and corresponding pair of edge directors are shown in FIG. 1.

Molten glass is delivered into open channel 24 by means of a delivery passage 38 that is in fluid communication with the open channel 24. A pair of dams 40 are provided above overflow weirs 27 and 28 adjacent each end of open channel 24 to direct the overflow of the free surface 42 of molten glass over overflow weirs 27 and 28 as separate flows of molten glass. Only the pair of dams 40 that are located at the end of the open channel 24 that is adjacent the delivery passage 38 are shown in FIG. 1. The separate flows of molten glass flow down over the pair of opposed substantially vertical forming surfaces 30 and the pair of opposed downwardly inclined converging forming surfaces 32 to the root 34 where the separate flows of molten glass, shown in broken lines in FIG. 1, converge to form the glass ribbon 44.

Each pair of edge directors 50 keeps molten glass along a respective downwardly inclined converging forming surface 32, until the molten glass reaches the root 34.

Pulling rolls 46 are located downstream of the root 34 of the forming wedge 22 and engage side edges 48 at both sides of the glass ribbon 44 to apply tension to the glass ribbon 44. The pulling rolls 46 may be positioned sufficiently below the root 34 that the thickness of the glass ribbon 44 is essentially fixed at that location. The pulling rolls 46 may draw the glass ribbon 44 downwardly at a prescribed rate that establishes the thickness of the glass ribbon as it is formed at the root 34.

FIG. 1 also illustrates an exemplary laser beam control system 10 that can include a laser generator 12 that is configured to generate and emit a laser beam 13. In an embodiment, the laser beam 13 is directed to molten glass below (e.g., just below) root 34, where the laser beam energy provided by laser beam 13 is uniform at points of incidence across the molten glass. As illustrated in the aspect of FIG. 1, the laser beam 13 can be directed by laser generator 12 to the molten glass via, for example, reflecting apparatus 14. Although one laser generator 12 generating a laser beam 13 to reflecting apparatus 14 is illustrated, in some examples, additional laser beam control system 10 may employ additional laser generators 12 and/or reflecting apparatus 14. For example, laser beam control system 10 may employ a second laser generator 12 to direct a laser beam to the molten glass via reflecting apparatus 14. As another example, laser beam control system 10 may employ a second laser generator 12 to direct a laser beam to the molten glass via a second reflecting apparatus 14.

In an embodiment, reflecting apparatus 14 can include a reflecting surface 15 that is configured to receive the laser beam 13 generated and emitted by the laser generator 12 and reflected onto at least predetermined portions of the molten glass. Reflecting apparatus 14 may be, for example, a mirror configured to deflect a laser beam from laser generator 12. Reflecting apparatus 14 may therefore function as a beam-steering and/or scanning device. In FIG. 1, the laser beam 13 is illustrated as being advanced by reflecting apparatus 14 as reflected laser beams 17 to a plurality of preselected portions of the molten glass.

The reflecting surface 15 in one example can comprise a gold-coated mirror although other types of mirrors may be used in other examples. Gold-coated mirrors may be desirable under certain applications to provide superior and consistent reflectivity relative to infrared lasers, for example. In addition, the reflectivity of gold-coated mirrors is virtually independent of the angle of incidence of laser beam 13 and, therefore, the gold-coated mirrors are particularly useful as scanning or laser beam-steering mirrors.

The reflecting apparatus 14 in the embodiment illustrated in FIG. 1 may also include a regulating mechanism 16 (e.g., a galvanometer or polygon scanner) configured to adjust an attitude of the reflecting surface 15 of the reflecting apparatus 14 relative to the receipt of the laser beam 13 and a location of a preselected portion of an edge director 50. For example, reflecting apparatus 14 can rotate or tilt reflecting surface 15 to direct laser beam 13 to a predetermined portion of an edge director 50 as reflected laser beams 17, for example.

According to one example, the regulating mechanism 16 can comprise a galvanometer that is operatively associated with the reflecting surface 15 so that the reflecting surface 15 can be rotated by the galvanometer along an axis in relation to the glass ribbon 44. For example, the reflecting surface 15 can be mounted on a rotating shaft 18 that is driven by a galvanometer motor and rotated about axis 18a as shown by double arrow 19.

Figure 2:
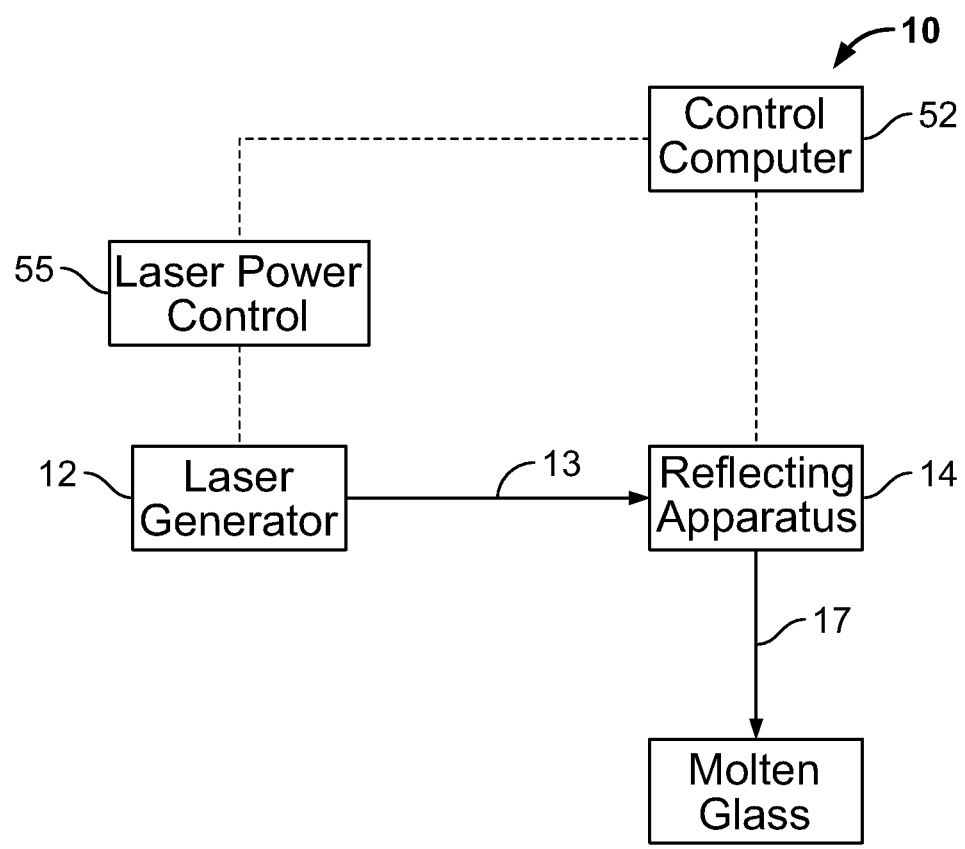
FIG. 2 is a block diagram of an exemplary laser beam control system in accordance with some examples.

FIG. 2 illustrates portions of exemplary laser beam control system 10 wherein solid lines with an arrow represent laser beams (e.g., laser beam 13, reflected laser beams 17) and dashed lines represent electrical control signals. In this example, laser beam control system 10 can include laser power control 55 and control computer 52. Each of laser power control 55 and control computer 52 can include one or more processors, one or more field-programmable gate arrays (FPGAs), one or more application-specific integrated circuits (ASICs), one or more state machines, digital circuitry, or any other suitable circuitry. In some embodiments, one or more of laser power control 55 and control computer 52 may be implemented in any suitable hardware or hardware and software (e.g., one or more processors executing instructions stored in memory). For example, a non-transitory computer readable medium such as, for example, a read-only memory (ROM), an electrically erasable programmable read-only memory (EEPROM), flash memory, a removable disk, CD-ROM, any non-volatile memory, or any other suitable memory, may store instructions that may be obtained and executed by any one or more processors of laser power control 55 and control computer 52 to execute one or more of the functions described herein.

Laser power control unit 55 can control the operation of the laser generator 12 so that the pulse energy, beam width, power level, and/or wavelength of the laser beam 13 generated at laser generator 12 comprises preselected values. In addition, laser power control unit 55 can control the time intervals during which the laser generator 12 generates the laser beam 13. In turn, a control computer 52 can be provided to control the operation of the laser power control unit 55 whereby the laser power control unit 55 may cause laser generator 12 to generate, during preselected time intervals, a laser beam 13 having preselected wavelength and power characteristics. At the same time, the control computer 52 may be operatively associated with the reflecting apparatus 14 to control the functioning of the regulating mechanism 16, and in a particular example where a galvanometer is employed, the motor of the galvanometer. Accordingly, the control computer 52 can be capable of adjusting the attitude and positioning of the reflecting surface 15 relative to the receipt of the laser beam 13 by the reflecting surface 15 and the locations of preselected portions of the molten glass.

For example, control computer 52 may configure regulating mechanism 16 to adjust (e.g., tilt or rotate), for preselected time periods, the reflecting surface 15 of the reflecting apparatus 14 in a plurality of varying attitudes relative to the receipt of the laser beam 13 and the reflection of the laser beam at the reflecting surface 15 of the reflecting apparatus 14. Consequently, the laser beam 13 can be directed onto a plurality of preselected portions of the molten glass during respective preselected time periods, as illustrated by the reflected laser beams 17 in FIG. 1, for example, thereby controlling the thickness of the molten glass.

In some examples, as described further below, laser beam control system 10 may include a dynamic focus module that directs the laser beam to a multiplexer. The multiplexer may be, for example, a time multiplexer or a split multiplexer. The multiplexer may direct the laser beam to one or more beam splitters. The beam splitters may split the laser beam into multiple laser beams, which may be directed to the molten glass. In some examples, laser beam control system 10 may include additional reflecting surfaces 15 and/or corresponding regulating mechanisms 16 to direct the laser beam to the molten glass. In some examples, control computer 52 may configure the one or more of the multiplexers, beam splitters, and regulating mechanisms.

FIGS. 3A and 3B illustrates a laser beam 302, such as one generated by laser beam control system 10 incident on a portion of molten glass, such that the laser beam forms a laser beam shape 304 on the molten glass. The molten glass is positioned at the location of the opposing arrows in FIGS. 3A and 3B. In FIG. 3A, the angle of incidence of the laser beam 302 to the portion of molten glass is 0 degrees (i.e., normal to the portion of molten glass). In FIG. 3B, the angle of incidence of the laser beam 302 to the portion of molten glass is greater than 0 degrees (i.e., oblique to the portion of molten glass 306), thereby causing the laser beam 302 to form a laser beam shape 306 on the molten glass. As indicated by laser beam shape 304 and laser beam shape 306 in FIGS. 3A and 3B, respectively, the power density of the laser beam 302 across the portion of molten glass is less in FIG. 3B than in FIG. 3A due to the increased angle of incidence. As such, as the angle of incidence of laser beam 302 increases, the power density of the laser beam 302 over portions of molten glass decreases, thereby causing an uneven distribution of laser energy density over the molten glass.

In some examples, laser beam control system 10 compensates for the decrease in laser energy density due to the incidence angle of laser beam 302 onto the molten glass. For example, control computer 52 may configure regulating mechanism 16 to adjust (e.g., tilt or rotate) the reflecting surface 15 of the reflecting apparatus 14 to direct laser beam 302 to the molten glass at an incidence angle. Based on the adjustment to reflecting surface 15, control computer 52 may compute an expected power density of laser beam 302 based on the incidence angle of laser beam 302. For example, as the reflecting surface 15 directs the laser beam 302 away from the center of the molten glass (assuming reflecting surface is in line with the center of the molten glass, as illustrated in FIG. 1), control computer 52 may cause laser power control unit 55 to increase the power of the generated laser beam 302. As such, laser beam control system 10 maintains a same power density as the laser beam is scanned across the molten glass.

FIG. 4 illustrates a chart indicating laser beam reflection intensities incident on molten glass. As indicated in the figure, the intensity of reflected laser beam tends to increase at angles of incident above Brewster's angle. The intensity also varies based on laser beam polarization, as indicated by the various curves. In this example, curve Rp identifies intensities for a P-polarized laser beam reflection off the molten glass, whereas curve Rs identifies intensities for an S-polarized laser beam reflection off the molten glass.

In some examples, laser beam control system 10 compensates for the increase in laser energy reflection due to the incidence angle of laser beam 302 onto the molten glass. For example, control computer 52 may configure regulating mechanism 16 to adjust (e.g., tilt or rotate) the reflecting surface 15 of the reflecting apparatus 14 to direct laser beam 302 to the molten glass at an incidence angle. Based on the adjustment to reflecting surface 15, control computer 52 may compute an expected power density of laser beam 302 based on the incidence angle of laser beam 302. For example, as the reflecting surface 15 directs the laser beam 302 away from the center of the molten glass (assuming reflecting surface is in line with the center of the molten glass, as illustrated in FIG. 1), control computer 52 may cause laser power control unit 55 to increase the power of the generated laser beam 302. As such, laser beam control system 10 maintains a same power density as the laser beam is scanned across the molten glass.

FIG. 5 illustrates a lateral shift, represented by "d," experienced by a laser beam 502 proceeding through a window 504. The shift is caused by principles of physics related to Snell's Law, and may be computed, at least in some examples, according to the equation illustrated in the figure. In the equation, "$n_2$" represents an index for the material of the window 504, and "$n_1$" represents an index for the environment outside the window, e.g., air. In some examples, a stack-up of windows is employed or a water-cooled layer is employed between windows. In these examples, the equation is modified according to the optical stack of windows.

In some examples, laser beam control system 10 compensates for the lateral shift caused to laser beam 502 when proceeding through a window, such as window 504. For example, control computer 52 may compute an expected lateral shift of laser beam 502 when proceeding through a window based on, for example, Snell's law (e.g., the equation illustrated in FIG. 5). Control computer 52 may then configure regulating mechanism 16 to adjust (e.g., tilt or rotate) the reflecting surface 15 of the reflecting apparatus 14 based on the expected lateral shift caused by the window to direct laser beam 502 to the molten glass. For example, assume that laser beam 502 is to proceed through a window before reaching a target portion of molten glass. Also assume that control computer 52 computes an expected lateral shift of the laser beam when proceeding through the window at angle greater than 0 (e.g., not normal to the window). Control computer 52 may configure regulating mechanism 16 to adjust the reflecting surface 15 of the reflecting apparatus 14 such that the laser beam 502, when reflected off of reflecting apparatus 14, will be incident on the window at a position that offset by the amount of the expected lateral shift. As such, after proceeding through the window, the laser beam 502 may reach the target portion of the molten glass (e.g., rather than being offset by the amount of the computed lateral shift).

FIGS. 6A and 6B illustrate the shaping of a laser beam by laser beam control system 10. FIG. 6A illustrates a laser beam 602 that has a laser beam profile 604. Laser beam control system 10 may employ, for example, one or more beam shaping elements to shape a laser beam as illustrated in FIG. 6B. Each beam shaping element may be, for example, a diffractive optical element (DOE) or spatial light modulator (SLM). In some examples, one or more of slits, pinholes, lenses, and/or mirrors are employed to shape the laser beam.

Figure 8:
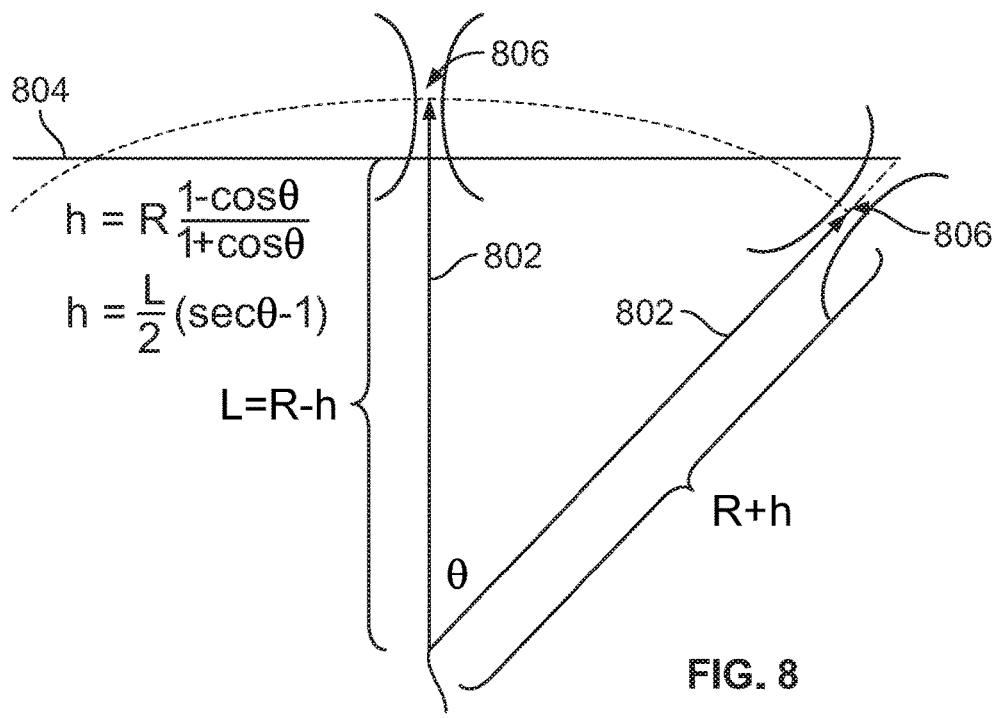
FIG. 8 illustrates the positioning of a laser beam waist on glass by the laser beam control system of FIG. 2 in accordance with some examples.

For example, as illustrated in FIG. 6B, laser beam 608 may be shaped by one or more beam shaping elements. As illustrated, laser beam 608 has steeper edges than laser beam 602. For example, compared to laser beam 602, laser beam 608 is shaped more similar to a "top hat." As a result of generating laser beam 608, thickness features on heated glass can have better defined (e.g., sharper) edges. Thus effects from laser beam 608 on the glass can be more narrowly localized and as a result higher spatial frequency thickness features can be created. FIG. 8 also illustrates a laser beam profile 610 for laser beam 608. When laser beam 608 is incident on molten glass, a heat affected zone on molten glass may result. A heat affected zone caused by laser beam 608 may be more narrowly defined than a heat affected zone caused by laser beam 602. As such, by generating laser beam 608, laser beam control system 10 may more accurately control where heat is generated on molten glass. For example, laser beam control system 10 can generate sharper edges on a top hat beam and thus can more precisely control where on the glass the heat is directed. In addition more uniform heating can be provided along the beam profile when compared to traditional Gaussian beams.

In some examples, laser beam control system 10 may employ, for example, one or more beam shaping elements to elongate a laser beam. For example, FIG. 7A illustrates a laser beam with a nominal (e.g., small and symmetric) beam shape that, if scanned across molten grass at a constant height, may allow for gaps in the scanning (e.g., areas of molten glass not "hit" by the laser beam). In this example, gaps are present in the scan pattern as a result of the glass moving perpendicular to the back-and-forth scan motion from the scanner. FIG. 7B, however, illustrates a laser beam that has been elongated by laser beam control system 10 (e.g., with one or more beam shaping elements). In this example, by elongating the laser beam, laser beam control system 10 reduces or eliminates gaps in the scanning of molten glass (e.g., as the molten glass moves perpendicular to the back-and-forth scan motion from the scanner). In some examples, laser beam control system 10 elongates a laser beam in the draw direction to minimize or eliminate gaps in the application of the laser beam to the molten glass. In some examples, laser beam control system 10 elongates a laser beam in the scan direction to minimize or eliminate gaps in the application of the laser beam to the molten glass FIG. 8 illustrates the positioning of a laser beam waist of a laser beam 802 on molten glass 804 by the laser beam control system 10. For example, as a laser beam 802 is scanned across molten glass 804, a distance "L" from a laser beam source 810 (e.g., a reflecting apparatus 14) to the molten glass 804 varies, while a laser beam waist 806 of the laser beam 802 remains at a distance "R" to the laser beam source 810. For example, as indicated in the figure, a laser beam waist 806 (represented by opposing curved arcs) of a laser beam 802 at a normal incidence (e.g., θ=0 degrees) to molten glass 802 may occur behind molten glass 804. Likewise, a laser beam waist 806 of the same laser beam 802, but incident at an angle other than 0 degrees (e.g., θ>0 degrees) may occur before molten glass 804.

In some examples, such as when employing fixed optics to deliver the laser beam 802 from a laser generator 12 via a laser beam source 810 to molten glass 804, control computer 52 causes laser power control unit 55 to generate laser beam 802 such that the waist of the laser beam 802 occurs at a same distance from the laser beam source 810 regardless of the angle of incident of the laser beam 802 on the molten glass (e.g., as illustrated in FIG. 8). In this example, control computer 52 configures laser power control unit 55 to generate laser beam 802 such that when the laser beam 802 is incident on molten glass 804 at a normal angle (e.g., θ=0 degrees), the waist of the laser beam 802 occurs at a distance (e.g., "h") behind molten glass 804. The distance can be the same distance that the waist of the laser beam 802 is in front of the molten glass when the laser beam 802 is incident on molten glass 804 at a greatest angle (e.g., θ is such that laser beam 802 is received at the edges of molten glass 804).

Figure 9A:
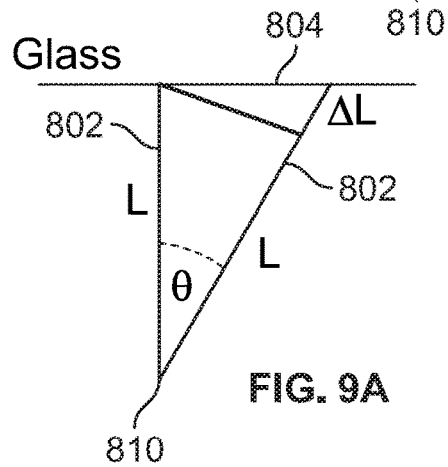
FIGS. 9A and 9B illustrate lengths a laser beam travels at various angles before reaching glass in accordance with some examples.
Figure 9B:
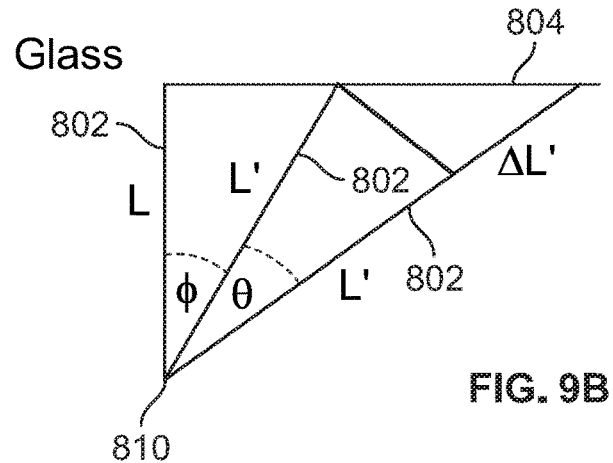
Figure 10A:
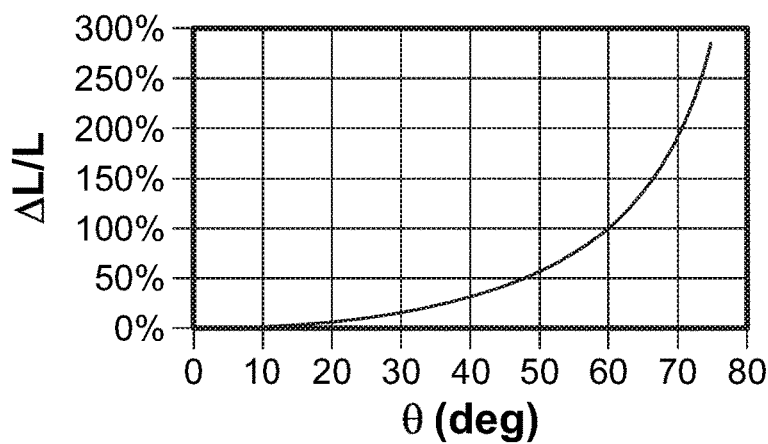
FIGS. 10A and 10B illustrate charts indicating the length a laser beam travels at various angles before reaching glass in accordance with some examples.
Figure 10B:
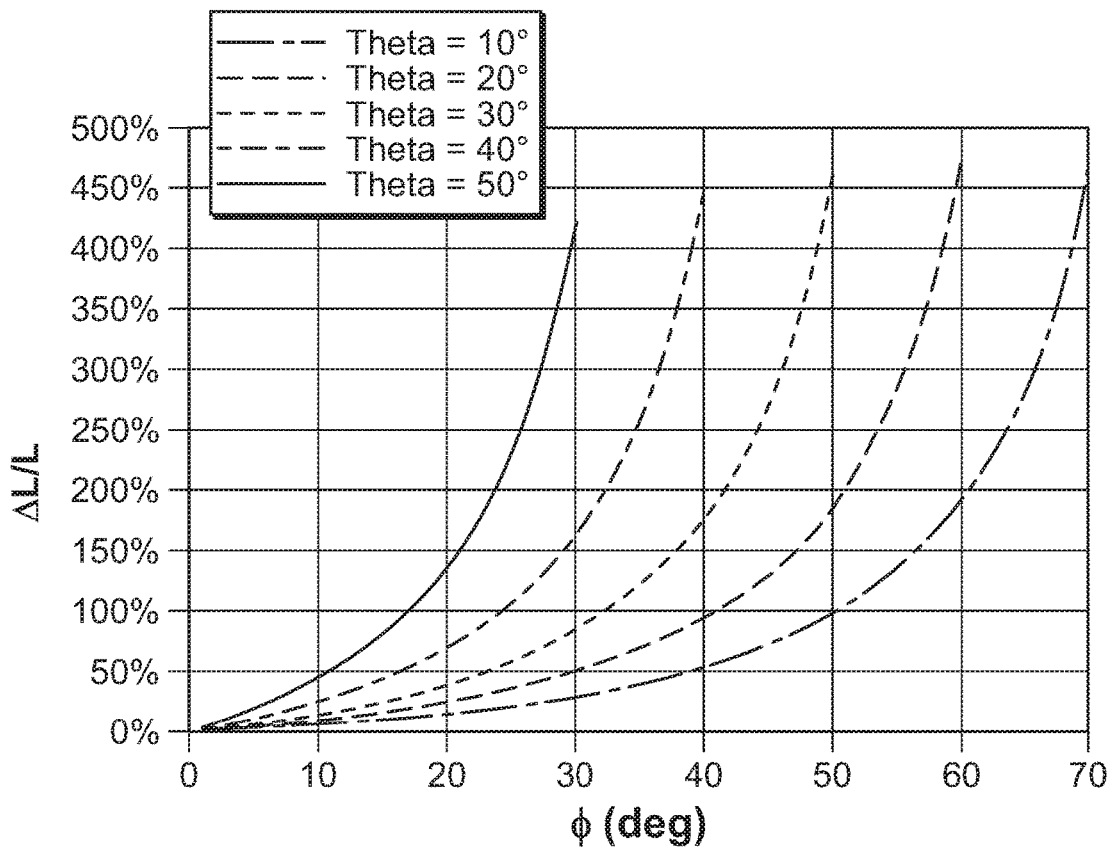

FIG. 9A illustrates the additional distance (indicated by "ΔL") that the laser beam 802 would travel from laser beam source 810 to molten glass 804 when the laser beam is at an angle θ from normal to molten glass 804. In other words, FIG. 9A illustrates an approach where laser beam 802 is scanned symmetrically ±θ about an angle that is perpendicular to the glass. Here laser beam 802 is pointed nominally straight at the glass. FIG. 10A illustrates a chart with a curve indicating a percentage of the additional distance the laser beam 802 would need to travel relative to an original distance (indicated by "L"). FIG. 9B illustrates another additional distance (indicated by "ΔL'") that the laser beam 802 would travel from laser beam source 810 to molten glass 804. In this example, the laser beam 802 is nominally inclined with respect to the glass by an angle of ϕ. In addition, laser beam 802 is scanned symmetrically ±θ across the molten glass 804. FIG. 10B illustrates a chart with various curves indicating a percentage of the additional distance the laser beam 802 would need to travel relative to an original distance, where each curve is representative of a respective initial angle movement θ.

In some examples, laser beam control system 10 compensates for the varying position of the laser beam waist. For example, control computer 52 may configure regulating mechanism 16 to adjust (e.g., tilt or rotate) the reflecting surface 15 of the reflecting apparatus 14 to direct laser beam 302 to the molten glass at an incidence angle. Control computer 52 may compute a distance laser beam 802 will travel (e.g., distance "L") from reflecting surface 15 to molten glass 804 (e.g., based on a known distance from reflecting surface 15 to molten glass 804 and an angle of incidence of the laser beam relative to the molten glass 804). In some examples, laser beam control system 10 can control where the waist of the laser beam 802 occurs. For example, laser beam control system 10 can optically control where the waist of the laser beam 802 occurs by adding optics between laser generator 12 and the reflecting apparatus 14, or by using an adjustable optical module such as dynamic focus device 1102 (discussed further below). For example, as the reflecting surface 15 directs the laser beam 802 away from the center of the molten glass 804 (assuming reflecting surface is in line with the center of the molten glass, as illustrated in FIG. 1), control computer 52 may cause laser power control unit 55 to generate laser beam 802 such that the waist of the laser beam 802 occurs at a longer distance from reflecting surface 15 (e.g., compared to when the laser beam 802 is directed to the center of the molten glass 804). As such, laser beam control system 10 maintains the occurrence of the waist of the laser beam 802 at or near molten glass 804 as the laser beam 802 is scanned across the molten glass 804. In some examples, control computer 52 controls a dynamic focus device (discussed further below) to correct for changes in the distance from laser beam source 810 to the molten glass 804 such that the waist of the laser beam 802 is positioned along molten glass 804 across a scan.

Figure 11:
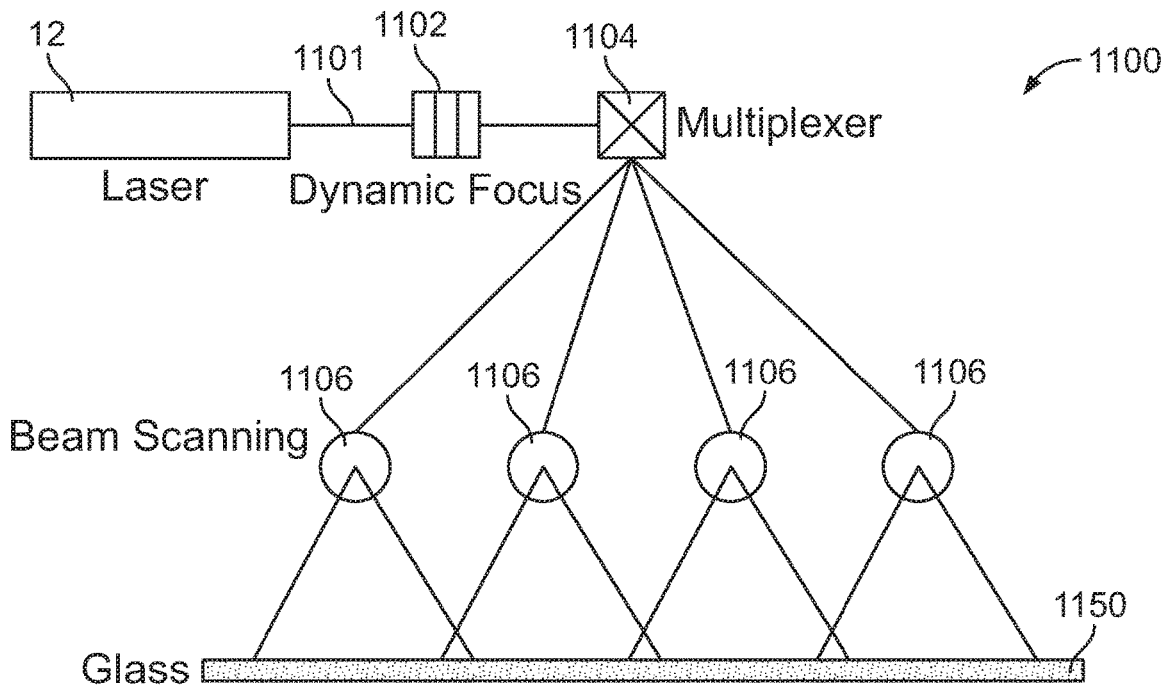
FIGS. 11, 12, 13, 14, and 15 schematically illustrate exemplary multiplexing laser beam control systems in accordance with some examples.

FIG. 11 illustrates a multiplexing laser beam control system 1100 that includes a laser generator 12 (which in some examples may include laser power control 55), a dynamic focus device 1102, a multiplexer 1104 (e.g., a laser beam multiplexing device), and several beam scanning devices 1106 to direct a laser beam 1101 from the laser generator 12 to molten glass 1150. In this example, the glass is nominally flowing in the direction perpendicular to the plane of the laser scan (i.e., in/out of the page). The molten glass 1150 may be provided by, for example, the glass forming apparatus 20 of FIG. 1. Although not illustrated, multiplexing laser beam control system 1100 may also include control computer 52. In some examples, control computer 52 is communicatively coupled to one or more of laser generator 12, dynamic focus module 1102, multiplexer 1104, and beam scanning modules 1106.

In this example, dynamic focus device 1102 receives a laser beam 1101 from laser generator 12, and is operable to provide independent focus of the received laser beam 1101

(e.g., via a focus lens). For example, control computer 52 may cause dynamic focus device 1102 to adjust a focus of the received laser beam 1101. Dynamic focus device 1102 directs the focused laser beam to multiplexer 1104.

Multiplexer 1104 may be a time multiplexer (e.g., routes the laser beam among various pathways on a time basis), or a spatial multiplexer (e.g., routes the laser beam among various pathways simultaneously). Multiplexer 1104 may operate temporally, spatially, or spatial-temporally, for example. In some examples, control computer 52 configures multiplexer 1104 to route the laser beam among the various pathways, such as to beam scanning devices 1106. Multiplexing the laser beam may provide one or more advantages, such as allowing for the scaling of the laser beam control system 1100 for large draws using a single laser generator 12.

In some examples, rather than a dynamic focus device 1102 being position between laser generator 12 and multiplexer 1104 (e.g., such as when multiplexer 1104 is a time multiplexer), a dynamic focus device 1102 is positioned along the pathways from multiplexer 1104 to each beam scanning device 1106.

Each beam scanning device 1106 may be, for example, a reflecting apparatus 14. In some examples, each beam scanning device 1106 may be a diffractive optical element, an acousto-optic modulator, or other optical and electronic scanning device. Each beam scanning device 1106 may receive the laser beam from multiplexer 1104, and scan the laser beam over a portion of molten glass 1150, thereby heating up the respective portion of molten glass. In this example, each beam scanning device 1106 covers approximately one-fourth of molten glass 1150, although in some examples, the portion of molten glass covered by one beam scanning device 1106 may overlap with a portion of molten glass covered by another beam scanning device 1106.

In some examples, each beam scanning device 1106 is communicatively coupled to dynamic focus device 1102. Dynamic focus device 1102 may readjust a focus of the laser beam based on which beam scanning devices 1106 are active. For example, each beam scanning device 1106 may be synchronized with dynamic focus device 1102, such as when multiplexer 1104 is splitting the laser beam among the various beam scanning devices simultaneously.

In some examples, each beam scanning device 1106 is positioned at a known distance and angle to multiplexer 1104. For example, control computer 52 may determine the distance and angle from the multiplexer to each beam scanning device 1106 based on user input, or based on obtaining the data from a database, for example. Control computer 52 may configure a power density of the laser beam based on the distance and angle from the multiplexer to each active beam scanning device 1106.

For example, control computer 52 may configure laser generator 12 to adjust a power density of the laser beam based on an incidence angle of a laser beam on molten glass 1150. For example, multiplexing laser beam control system 1100 may compensate for a decrease in laser beam power densities provided to molten glass 1150 due to the incidence angle of laser beam onto molten glass 1150. As another example, multiplexing laser beam control system 1100 may compensate for a decrease in laser energy absorption due to the incidence angle of laser beam onto molten glass 1150. As such, multiplexing laser beam control system 1100 maintains a same power density as the laser beam is scanned by each beam scanning device 1106 across molten glass 1150.

In some examples, multiplexing laser beam control system 1100 compensates for any lateral shift caused to the laser beam when proceeding through a window, such as window 504 in FIG. 5. In some examples, multiplexing laser beam control system 1100 shapes the generated laser beam to have steep edges. In some examples, multiplexing laser beam control system 1100 elongates the generated laser beam (e.g., in the draw direction) to minimize or eliminate any gaps as each beam scanning device 1106 scans the laser beam across molten glass 1150. In some examples, multiplexing laser beam control system 1100 elongates the laser beam in the scan direction to minimize or eliminate gaps in the application of the laser beam to the molten glass 1150. In some examples, multiplexing laser beam control system 1100 redirects the path of the laser beam (e.g., via one or more multiplexers) to adjust where the waist of the laser beam occurs.

In some examples, multiplexing laser beam control system 1100 may include additional laser generators 12 to generate additional laser beams to heat portions of molten glass 1150. For example, laser beam control system 1100 may employ a second laser 12, a second dynamic focus device 1102, and a second multiplexer 1104, to direct a laser beam generated by the second dynamic focus device 1102 to portions of molten glass 1150 via beam scanning devices 1106. The use of additional laser generators 12 may lessen the time needed to heat portions (e.g., all) of molten glass 1150.

Figure 12:
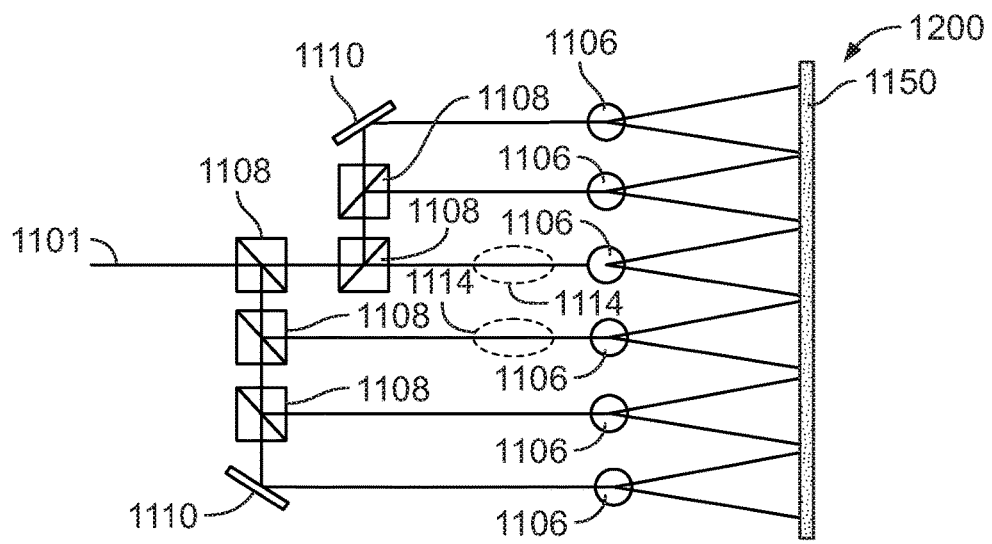

FIG. 12 illustrates portions of a multiplexing laser beam control system 1200 that includes multiple beam splitters 1108, multiple reflecting apparatus 1110, multiple path compensators 1114 (in this example, optional), and multiple beam scanning devices 1106 to direct a laser beam 1101 to molten glass 1150. The laser beam 1101 may be provided by, for example, a laser generator 12. Although not illustrated, multiplexing laser beam control system 1200 may also include control computer 52.

Each path compensator 1114 may be, for example, a static path compensator, or a dynamic path compensator. Each path compensator 1114 may delay a laser beam passing through the path compensator. For example, control computer 52 may configure each path compensator 1114 to delay a laser beam by a length of time.

Each beam splitter 1108 may split the laser beam among two or more pathways. For example, a beam splitter 1108 may split a laser beam along one pathway to another beam splitter 1108, and along another pathway to a reflecting apparatus 1110. In some examples, a beam splitter 1108 may receive multiple laser beams (e.g., from multiple sources, either simultaneously or time multiplexed), and provide the received laser beams along another pathway. For example, a beam splitter 1108 may receive a laser beam from a reflecting apparatus 1110 and from another beam splitter 1108, and provide the received laser beams to a beam scanning device 1106.

In this example, six beam scanning devices 1106 provide a laser beam to respective portions of molten glass 1150. In some examples, control computer 52 configures each of the six beam scanning devices 1106 to direct the laser beam to a respective portion of molten glass 1150. In some examples, control computer 52 configures each of the six beam scanning devices 1106 to direct the laser beam to respective portions of the molten glass 1150 that do not overlap. In some examples, control computer 52 configures at least two of the six beam scanning devices 1106 to direct the laser beam to overlapping portions of the molten glass 1150.

Figure 13:
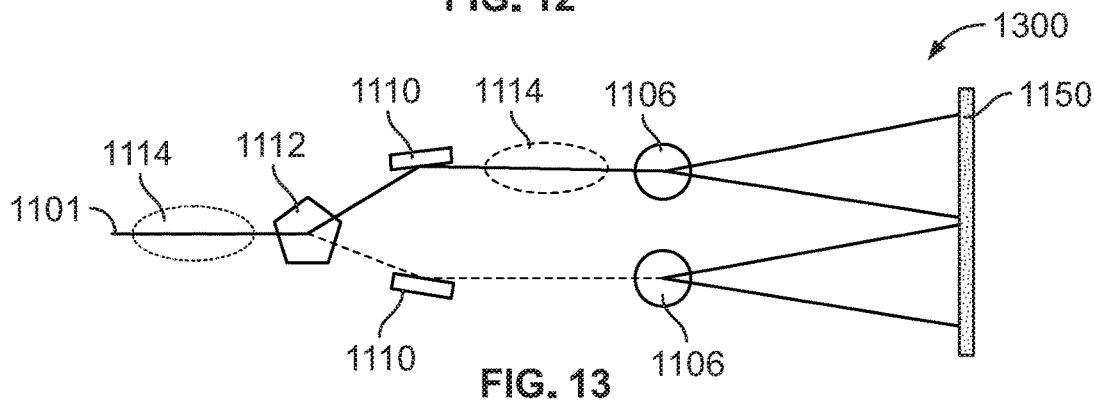

FIG. 13 illustrates portions of a multiplexing laser beam control system 1300 that includes a multiplexer 1112, multiple reflecting apparatus 1110, multiple path compensators 1114 (in this example, optional), and multiple beam scanning devices 1106 to direct a laser beam 1101 to molten glass 1150. A path compensator 1114, such as a focus path compensator, can be employed to readjust the focal length of an optical path so that the laser beam is still focused on the glass. The laser beam 1101 may be provided by, for example, a laser generator 12. Although not illustrated, multiplexing laser beam control system 1100 may also include control computer 52.

In this example, laser beam 1101 optionally proceeds through a first path compensator 1114 before arriving at multiplexer 1112, which may be a time multiplexer or split multiplexer. Based on the configuration of multiplexer 1112, the laser beam may proceed along one, or two, paths. Along one path, the laser beam proceeds to a reflecting apparatus (which may be configured by control computer 52), through an optional second path compensator 1114, before reaching a beam scanning device 1106. The beam scanning device 1106 provides the laser beam to portions of molten glass 1150. Along the other path, the laser beam proceeds to a reflecting apparatus (which may be configured by control computer 52) before reaching a beam scanning device 1106. The beam scanning device 1106 provides the laser beam to different portions of molten glass 1150.

Figure 14:
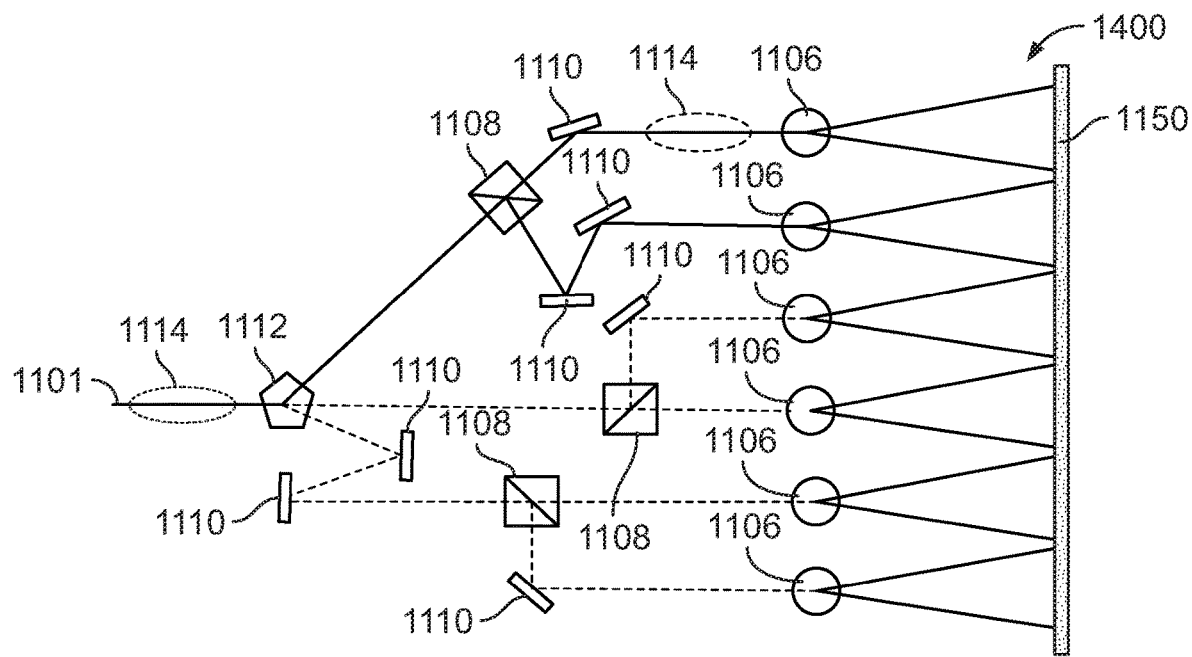

FIG. 14 illustrates portions of a multiplexing laser beam control system 1400 that includes multiple beam splitters 1108, multiple reflecting apparatus 1110, multiple path compensators 1114 (in this example, optional), and multiple beam scanning devices 1106 to direct a laser beam 1101 (e.g., from a laser generator 12, not shown) to molten glass 1150. Although not illustrated, multiplexing laser beam control system 1400 may also include control computer 52.

In this example, depending on the configuration of multiplexing laser beam control system 1400, laser beam 1101 may proceed along a path that includes multiple reflecting apparatus 1110, each which may be configured by control computer 52. In addition, each beam scanning device may be configured to direct a laser beam to differing portions of molten glass 1150. In some examples, the portions of molten glass may overlap with each other.

Figure 15:
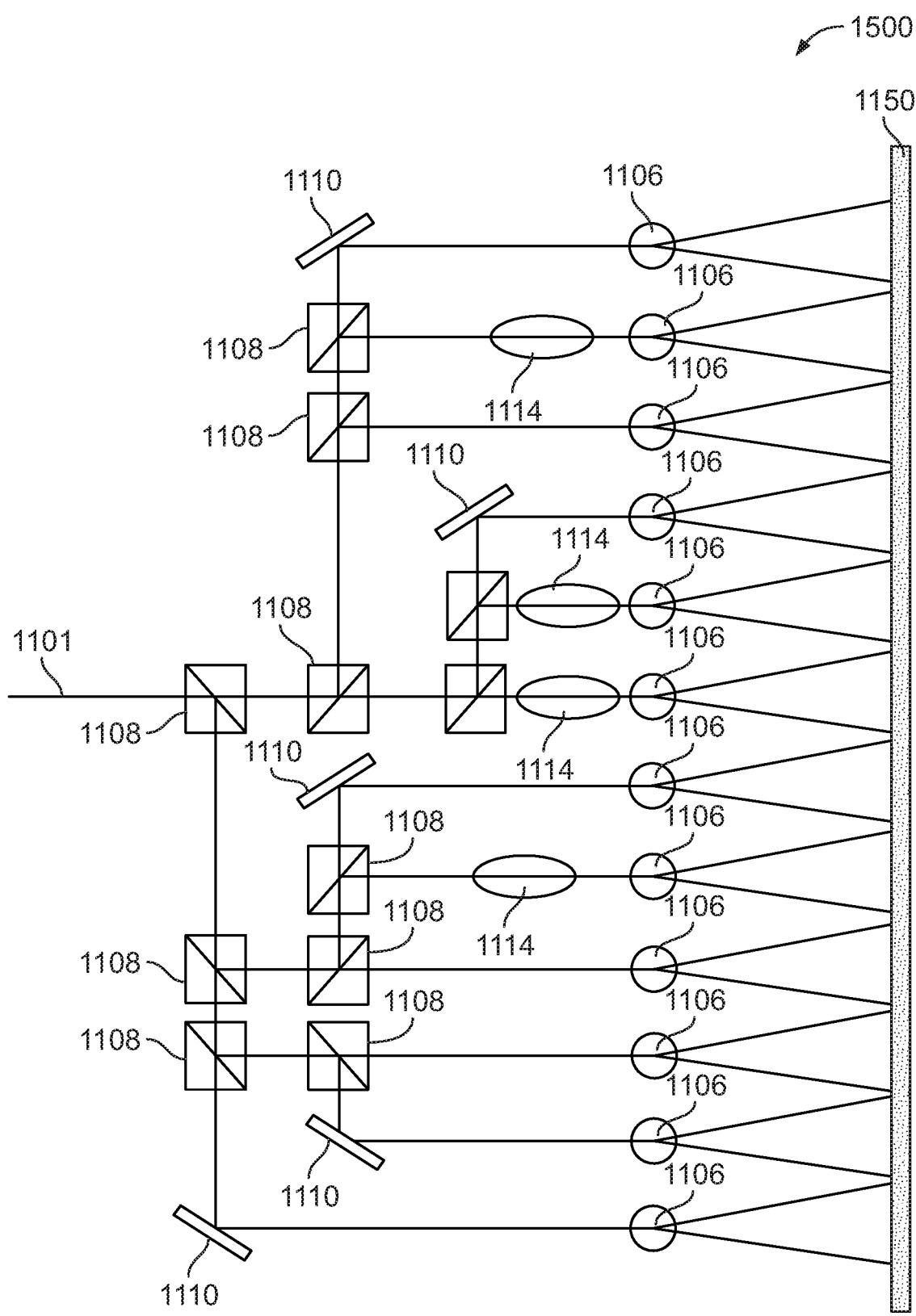

FIG. 15 illustrates portions of a multiplexing laser beam control system 1500 that includes multiple beam splitters 1108, multiple reflecting apparatus 1110, multiple path compensators 1114, and multiple beam scanning devices 1106 to direct a laser beam 1101 (e.g., from a laser generator 12, not shown) to molten glass 1150. Although not illustrated, multiplexing laser beam control system 1400 may also include control computer 52.

In this example, depending on the configuration of multiplexing laser beam control system 1500, laser beam 1101 may proceed along a path that includes multiple reflecting apparatus 1110, each which may be configured by control computer 52. In some examples, the path includes a path compensator 1114. In addition, each beam scanning device may be configured to direct a laser beam to a differing portions of molten glass 1150. In some examples, the portions of molten glass may overlap with each other. In some examples, the beam scanning devices 1106 are active simultaneously, thereby heating molten glass 1150 at various portions. In some examples, a subset of beam scanning devices 1106 are active at any one time. For example, control computer 52 may configure multiplexing laser beam control system 1500 such that every other beam scanning device 1106 is active at one time.

Figure 16:
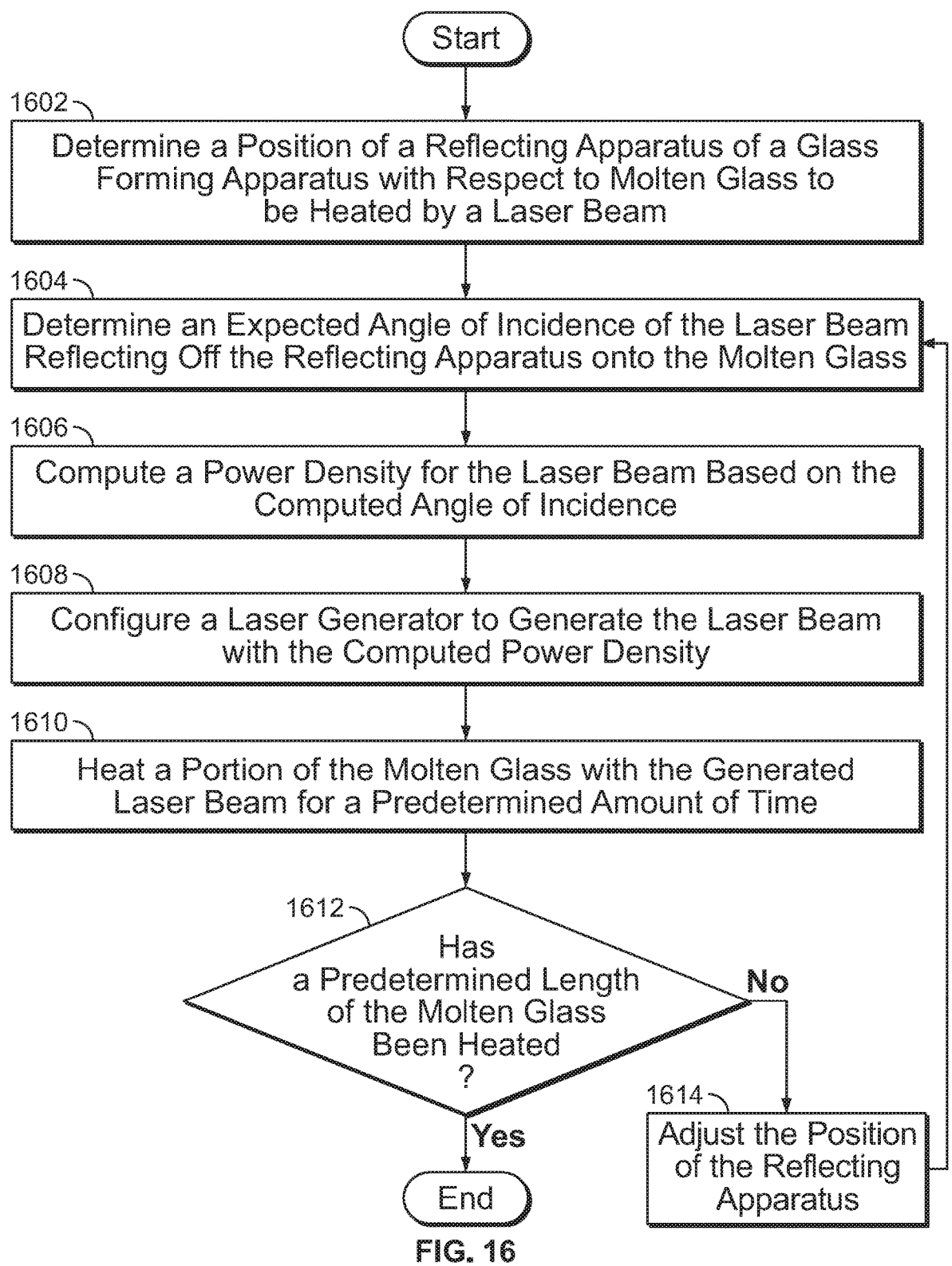
FIG. 16 illustrates an exemplary method that may be carried out by a laser beam control system in accordance with some examples.

FIG. 16 illustrates an exemplary method that may be performed by one or more computing devices, such as control computer 52. The method may be performed to adjust thickness of a molten glass ribbon. In some examples, the method is performed continuously as a laser beam is scanned across the glass. For example, calculations may be continuously performed as the laser beam is scanned across the glass surface, adjusting laser beam power (and/or laser beam shape, focus, etc.) continuously as the glass is formed. Beginning at step 1602, a position of a reflecting apparatus 14 of a glass forming apparatus 20 relative to molten glass to be heated by a laser beam can be determined. At step 1604, an expected angle of incidence of the laser beam reflecting off the reflecting apparatus 14 onto the molten glass is determined. At step 1606, a power density for the laser beam is computed based on the computed angle of incidence. For example, control computer 52 may determine a power density for the laser beam based on a target thickness profile or target temperature profile for the molten glass, and on the angle of incidence. Proceeding to step 1608, a laser generator 12 is configured to generate the laser beam with the computed power density. At step 1610, a portion of molten glass is heated with the generated laser beam for a predetermined amount of time. In some examples, the laser beam is continuously moved during a scan while its power is dynamically adjusted.

At step 1612, a determination is made as to whether a predetermined length of the molten glass has been heated. For example, a determination is made as to whether an entire length, minus side edges 48, has been heated. If the predetermined length of the motel glass has been heated, the method ends. Otherwise, if the predetermined length of the motel glass has not been heated, the method proceeds to step 1614, where the position of the reflecting apparatus 14 is adjusted For example, the reflecting apparatus 14 is adjusted such that a generated laser will heat a different portion of the molten glass. The method then proceeds back to step 1604.

Figure 17:
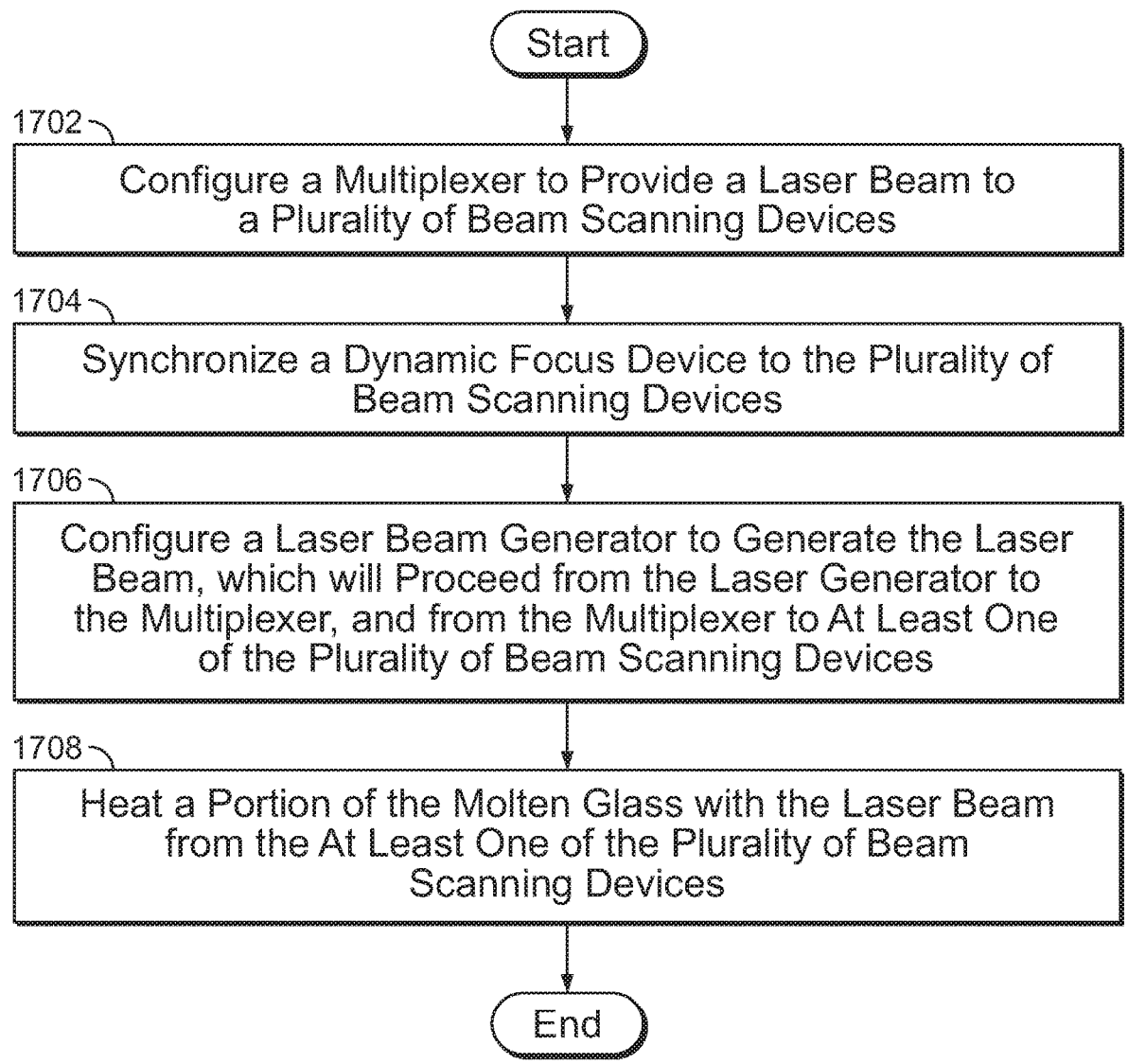
FIG. 17 illustrates another exemplary method that may be carried out by a laser beam control system in accordance with some examples.

FIG. 17 illustrates an exemplary method that may be performed by one or more computing devices, such as control computer 52. Beginning at step 1702, a multiplexer 1104 is configured to provide a laser beam to a plurality of beam scanning devices 1106. At step 1704, a dynamic focus device is synchronized to the plurality of beam scanning devices 1106. At step 1706, a laser generator 12 is configured to generate the laser beam, which proceeds from the laser generator 12, to the multiplexer 1104, and from the multiplexer 1104 to at least one of the plurality of beam scanning devices 1106. At step 1708, a portion of molten glass is heated with the laser beam from the at least one of the plurality of beam scanning devices 1106. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of this disclosure. Modifications and adaptations to these embodiments will be apparent to those skilled in the art and may be made without departing from the scope or spirit of this disclosure.

What is claimed is:

1. An apparatus comprising:
 a memory device configured to store instructions; and
 a controller comprising at least one processor and configured to execute the instructions, causing the controller to:
  preselect a portion of molten glass of a glass forming apparatus;
  configure a reflecting apparatus to reflect a laser beam from a laser generator to the preselected portion of the molten glass;
  determine a power density for the laser beam based on an angle of incidence of the laser beam relative to the preselected portion of the molten glass;
  determine a length the laser beam will travel from the reflecting apparatus to the preselected portion of the molten glass;
  configure the laser generator to generate the laser beam with a beam waist that is positioned at the preselected portion of the molten glass; and
  activate the laser generator to generate the laser beam at the determined power density to heat the preselected portion of the molten glass.

2. The apparatus of claim 1, wherein the controller is configured to determine the angle of incidence of the laser beam relative to the preselected portion of the molten glass based on a position of the reflecting apparatus.

3. The apparatus of claim 1, wherein the controller is configured to:
 determine an amount of laser energy of the laser beam to be reflected from the preselected portion of the molten glass based on the angle of incidence; and
 determine the power density for the laser beam based on the amount of laser energy of the laser beam to be reflected from the preselected portion of the molten glass.

4. The apparatus of claim 1, wherein the controller is configured to:
 determine a lateral shift the laser beam will experience when directed through at least one window; and
 configure the reflecting apparatus to reflect the laser beam from the laser generator to the preselected portion of the molten glass based on the determined lateral shift.

5. The apparatus of claim 1, wherein the controller is configured to:
 configure the reflecting apparatus to reflect the laser beam from the laser generator to another preselected portion of the molten glass; and
 determine a change in the length that the laser beam will travel from the reflecting apparatus to the another preselected portion of the molten glass.

6. The apparatus of claim 1, wherein the controller is configured to configure a multiplexer to direct the laser beam to a plurality of beam scanning devices, wherein each of the plurality of beam scanning devices can heat a respective portion of the preselected portion of the molten glass with the laser beam.

7. An apparatus comprising:
 a laser generator operable to generate a laser beam;
 a reflecting apparatus configured to reflect the laser beam from the laser generator to molten glass of a glass forming apparatus; and
 a controller communicatively coupled to the laser generator and the reflecting apparatus, the controller configured to:
  preselect a portion of the molten glass of the glass forming apparatus;
  configure the reflecting apparatus to reflect the laser beam from the laser generator to the preselected portion of the molten glass;
  determine a power density for the laser beam based on an angle of incidence of the laser beam relative the preselected portion of the molten glass;
  determine a length the laser beam will travel from the reflecting apparatus to the preselected portion of the molten glass;
  configure the laser generator to generate the laser beam with a beam waist that is positioned at the preselected portion of the molten glass; and
  activate the laser generator to generate the laser beam at the determined power density to heat the preselected portion of the molten glass.

8. The apparatus of claim 7, wherein the controller is configured to determine the angle of incidence of the laser beam relative the preselected portion of the molten glass based on a position of the reflecting apparatus.

9. The apparatus of claim 7, wherein the apparatus comprises a multiplexer and a plurality of beam scanning devices, the controller configured to configure the multiplexer to direct the laser beam to the plurality of beam scanning devices, wherein each of the plurality of beam scanning devices can heat a respective portion of the preselected portion of the molten glass with the laser beam.

10. The apparatus of claim 9, wherein the apparatus comprises a dynamic focus device, the laser generator configured to direct the generated laser beam to the dynamic focus device.

11. The apparatus of claim 10, wherein the controller is configured to synchronize the dynamic focus device with the plurality of beam scanning devices.

12. The apparatus of claim 9, wherein the apparatus comprises at least one beam splitter, the at least one beam splitter configured to direct the laser beam to at least one of the plurality of beam scanning devices.

13. The apparatus of claim 12, wherein the apparatus comprises a second beam splitter, the at least one beam splitter configured to direct the laser beam to the second beam splitter, the second beam splitter configured to direct the laser beam to at least a second of the plurality of beam scanning devices.

14. The apparatus of claim 13, wherein the apparatus comprises a second reflecting apparatus, the second beam splitter configured to direct the laser beam to the second reflecting apparatus.

15. A method for heating molten glass, the method comprising:
 drawing the molten glass from a forming apparatus;
 preselecting a portion of the molten glass;

configuring a reflecting apparatus to reflect a laser beam from a laser generator to the preselected portion of the molten glass;

determining a power density for the laser beam based on an angle of incidence of the laser beam relative to the preselected portion of the molten glass;

determining a length the laser beam will travel from the reflecting apparatus to the preselected portion of the molten glass;

configuring the laser generator to generate the laser beam with a beam waist that is positioned at the preselected portion of the molten glass; and activating the laser generator to generate the laser beam at the determined power density to heat the preselected portion of the molten glass.

16. The method of claim 15 wherein the angle of incidence is based on a position of the reflecting apparatus.

17. The method of claim 15 further comprising determining an amount of laser energy of the laser beam to be reflected from the preselected portion of the molten glass based on the angle of incidence and determining the power density for the laser beam based on the amount of laser energy of the laser beam to be reflected from the preselected portion of the molten glass.

18. The method of claim 15, further comprising determining a lateral shift the laser beam will experience when proceeding through at least one window and configuring the reflecting apparatus to reflect the laser beam from the laser generator to the preselected portion of the molten glass based on the determined lateral shift.

19. The method of claim 15, wherein the configuring the reflecting apparatus comprises determining a raster pattern for applying the laser beam to the preselected portion of the glass forming apparatus, the method further comprising activating the laser generator in accordance with the determined raster pattern.

20. The method of claim 15 wherein the configuring the reflecting apparatus comprises receiving position data from a position sensor identifying a position of the reflecting apparatus, the method further comprising at least one of rotating or tilting a reflecting surface of the reflecting apparatus based on the received position data.

* * * * *